United States Patent
Fukumoto (10) Patent No.: US 10,950,934 B2
(45) Date of Patent: Mar. 16, 2021

(54) WIRELESS ELECTRIC POWER TRANSMISSION APPARATUS AND ELECTRIC POWER TRANSFER SYSTEM

(71) Applicant: Mitsubishi Electric Corporation, Chiyoda-ku (JP)

(72) Inventor: Masaharu Fukumoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 35 days.

(21) Appl. No.: 16/090,496

(22) PCT Filed: Apr. 6, 2017

(86) PCT No.: PCT/JP2017/014322
§ 371 (c)(1),
(2) Date: Oct. 1, 2018

(87) PCT Pub. No.: WO2017/175822
PCT Pub. Date: Oct. 12, 2017

(65) Prior Publication Data
US 2019/0115656 A1    Apr. 18, 2019

(30) Foreign Application Priority Data
Apr. 8, 2016 (JP) .............................. JP2016-077969

(51) Int. Cl.
*H01Q 3/08* (2006.01)
*H01Q 3/26* (2006.01)
(Continued)

(52) U.S. Cl.
CPC ............. *H01Q 3/08* (2013.01); *H01Q 3/26* (2013.01); *H02J 50/23* (2016.02); *H02J 50/90* (2016.02);
(Continued)

(58) Field of Classification Search
CPC .... H01Q 3/01–3/08; H01Q 3/26; H01Q 3/12; H04B 7/00; H02J 50/23
See application file for complete search history.

(56) References Cited

U.S. PATENT DOCUMENTS

| | | | |
|---|---|---|---|
| 6,954,175 B1* | 10/2005 | Cox ........................ | G01S 19/41 342/357.31 |
| 8,131,213 B2* | 3/2012 | Porter ..................... | H04B 13/02 455/40 |

(Continued)

FOREIGN PATENT DOCUMENTS

| | | |
|---|---|---|
| JP | 2004-32879 A | 1/2004 |
| JP | 2004-88443 A | 3/2004 |

(Continued)

OTHER PUBLICATIONS

Extended European Search Report dated Feb. 27, 2019 in Patent Application No. 17779200.9, 9 pages.

(Continued)

*Primary Examiner* — Hasan Z Islam
(74) *Attorney, Agent, or Firm* — Oblon, McClelland, Maier & Neustadt, L.L.P.

(57) ABSTRACT

A microwave power transmission apparatus converts electric energy into microwaves, and transmits the microwaves to a microwave power receiver between sea and land. A power transmission antenna to emit the microwaves is directed to a direction of the microwave power receiver by a driver. When a beacon receiver detects a beacon signal transmitted by the microwave power receiver, a transmission signal generator generates a transmission signal emitted as microwaves from the power transmission antenna. Radio waves are not emitted from the power transmission antenna when the beacon signal is not detected. Not detecting the beacon signal corresponds to a situation where a power reception antenna cannot receive the microwaves due to (Continued)

motion of the antenna being on the sea. The wireless electric power transmission apparatus and electric power transfer system can prevent occurrence of a situation where the emitted microwaves cannot be received.

11 Claims, 5 Drawing Sheets

(51) Int. Cl.
*H02J 50/90* (2016.01)
*H02J 50/23* (2016.01)
*H04B 5/00* (2006.01)
*H02J 3/38* (2006.01)
*H04B 7/00* (2006.01)

(52) U.S. Cl.
CPC ............ *H04B 5/00* (2013.01); *H04B 5/0037* (2013.01); *H02J 3/386* (2013.01); *H04B 7/00* (2013.01)

(56) References Cited

U.S. PATENT DOCUMENTS

| | | |
|---|---|---|
| 2011/0080135 A1 | 4/2011 | Bland |
| 2011/0266995 A1 | 11/2011 | Winfield et al. |
| 2015/0207542 A1 | 7/2015 | Zeine |
| 2018/0062771 A1* | 3/2018 | Kikuma ................. H04B 17/27 |

FOREIGN PATENT DOCUMENTS

| | | |
|---|---|---|
| JP | 2013-217099 A | 10/2013 |
| WO | WO 2014/034966 A1 | 3/2014 |

OTHER PUBLICATIONS

Office Action dated Nov. 14, 2019 in corresponding Indonesian Patent Application No. PID201808753 (with English Translation), 4 pages.
Canadian Office Action dated Aug. 2, 2019 in Patent Application No. 3,019,894, 4 pages.
International Search Report dated May 16, 2017 in PCT/JP2017/014322 filed Apr. 6, 2017.
MHI Successfully Completes Ground Demonstration Testing of Wireless Power Transmission Technology for SSPS—Expanding the Potential for New Industrial Applications—, [online], Mitsubishi Heavy Industries Ltd., No. 5626, Mar. 12, 2015, Issue [Dec. 8, 2017 search], the Internet, <URL,http://www.mhi.co.jp/news/story/1503125626.html>.
Japanese Office Action dated Sep. 26, 2017 in Application No. 2017-545699, (with English translation).
Japanese Office Action dated Dec. 8, 2017 in Application No. 2017-545699, (with English translation).
Japanese Office Action dated Apr. 17, 2018 in Application No. 2017-545699, (with English translation).
European Office Action dated Sep. 4, 2020 in European Patent Application No. 17779200.9, 6 pages.
Canadian Office Action dated Jul. 10, 2020 in Canadian Patent Application No. 3,019,894, 4 pages.

* cited by examiner

WIRELESS ELECTRIC POWER TRANSMISSION APPARATUS AND ELECTRIC POWER TRANSFER SYSTEM

TECHNICAL FIELD

The present disclosure relates to a wireless electric power transmission apparatus and an electric power transfer system to transmit electric power by radio waves between sea and land.

BACKGROUND ART

Offshore power generation is expected to serve as an approach to satisfying future energy demand of Japan surrounded by the sea in every direction. Electric power generated by offshore wind power generation is transmitted to land through laid power supply cables, for example. A method using power supply cables, however, requires construction of laying the power supply cables, resulting in increased electric power costs. If the method of transmitting power to land can be replaced by microwave power transmission, the need for construction of laying the cables is eliminated.

In recent years, developments and tests have been conducted toward commercialization of microwave power transmission. Implementation of microwave power transmission from offshore power generation apparatus to land eliminates the need for construction of laying power cables and reduces electric power costs. Thus, offshore power generation becomes a more promising energy source to be promoted.

Japanese Patent Laid-Open No. 2004-88443 (Patent Document 1) discloses an electric power transfer system, in which the orientation direction of a power transmission antenna is controlled to prevent microwaves from moving out of a wave receiving surface, thereby implementing highly efficient electric power transfer. In this electric power transfer system, a plurality of regions are set on a wave receiving surface of a power reception antenna, and the magnitude of electric power transferred by microwaves in each region is detected, to control the orientation direction of a power transmission antenna based on magnitude distribution of the electric power detected in each region.

CITATION LIST

Patent Document

Patent Document 1: Japanese Patent Laid-Open No. 2004-88443

SUMMARY OF INVENTION

Technical Problem

In most offshore wind power generation applications, power generation equipment is installed on a floating body. The position and posture of such a floating body are shaken at all times under the influence of waves and winds. To perform stable electric power transmission on the sea, there is a need for a technique whereby a power transmission beam emitted by a power transmission antenna is directed to a reception antenna surface at all times even under the influence of motion due to waves and winds.

The electric power transfer system disclosed in aforementioned Japanese Patent Laid-Open No. 2004-88443 (Patent Document 1), however, is based on the premise that both antennas on the power transmission side and the power reception side are stably installed on land. A situation where the antennas are installed in places where their position and posture change constantly, such as on a floating body, is not considered. That is, the orientation direction of a power transmission beam on the power transmission side is controlled based on the magnitudes of electric power received at the plurality of regions on the wave receiving surface of the power reception antenna on the power reception side. As such, it is difficult to control, from a state where the power transmission beam on the power transmission side is not yet being directed to the power reception antenna on the power reception side, such as at the beginning of power transmission, the orientation direction of the power transmission beam to be directed to the power reception antenna. On the sea, the power transmission antenna is shaken more largely than when installed on the ground, which may cause the power transmission beam of the power transmission antenna to be moved out of the power reception antenna surface, resulting in failure to correct the antenna orientation due to the change on the power reception side. In such a case, the power transmission beam is emitted in a direction apart from the power reception antenna, resulting in wasted power. Also when the power reception antenna is on the sea, the power reception antenna is shaken and changed in its orientation direction, which may result in failure to receive the radio waves emitted by the power transmission antenna.

An object of the present disclosure is to provide a wireless electric power transmission apparatus and an electric power transfer system that can prevent the occurrence of a situation where microwaves are emitted when a power reception antenna cannot receive the microwaves even when affected by motion due to waves and winds.

Solution to Problem

A wireless electric power transmission apparatus and an electric power transfer system according to the present disclosure include a power transmission antenna, a driver, a beacon receiver, and a transmission signal generator. The power transmission antenna emits radio waves toward a power receiver, including a power reception antenna having a directivity, for receiving electric power transferred by radio waves between sea and land. The driver causes the power transmission antenna to be directed to a direction in which the power receiver exists. The beacon receiver detects a beacon signal transmitted by the power receiver. The transmission signal generator generates, when the beacon receiver detects the beacon signal, a transmission signal emitted as radio waves from the power transmission antenna. Radio waves are not emitted from the power transmission antenna in a case where the beacon signal is not detected, the case corresponding to a situation where either the power transmission antenna or the power reception antenna being on the sea is moved, motion of the power transmission antenna or the power reception antenna causes change in its orientation direction, and the power reception antenna cannot receive the radio waves emitted by the power transmission antenna.

Advantageous Effects of Invention

According to the present disclosure, even when a power transmission antenna or a power reception antenna installed on the sea is affected by motion due to waves and winds while emitting or receiving microwaves, a situation where the microwaves are emitted when the power reception antenna cannot receive the microwaves can be prevented from occurring.

DESCRIPTION OF EMBODIMENTS

Embodiments of the present disclosure are described hereinafter in detail with reference to the drawings. While a plurality of embodiments are described below, it is initially intended to combine appropriately the configurations described in the respective embodiments. The same or corresponding parts are designated by the same symbols in the drawings and description thereof is not repeated.

Figure 1:
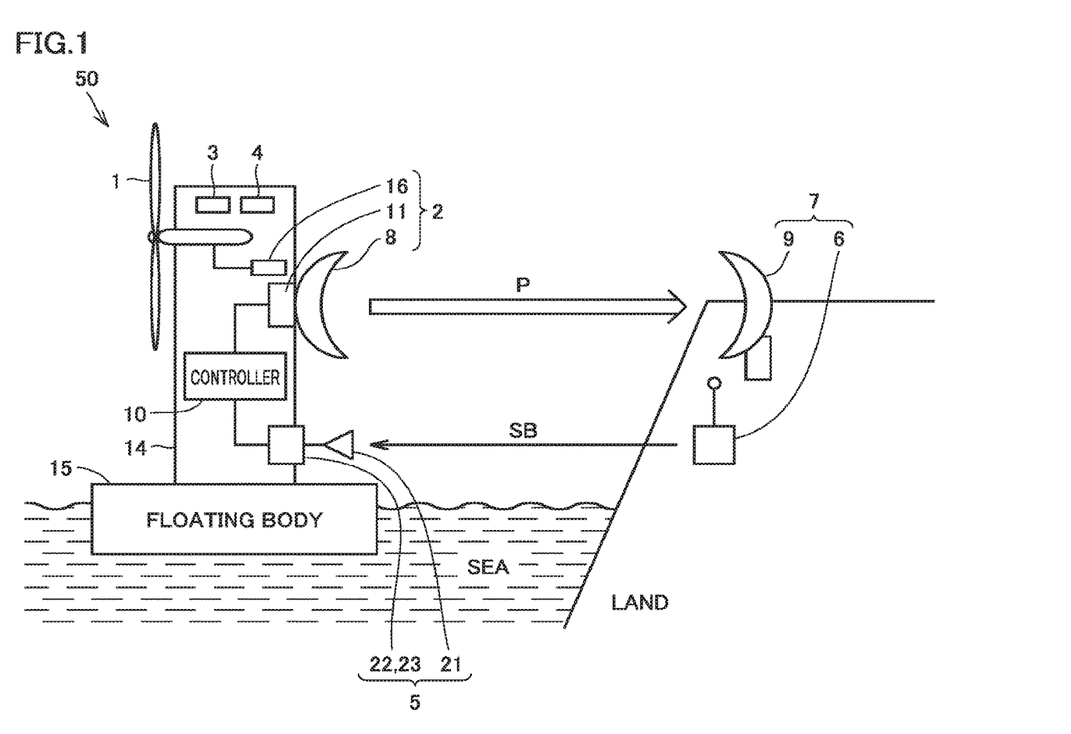
FIG. 1 is a schematic diagram showing a system configuration of an electric power transfer system according to an embodiment of the present disclosure.
Figure 2:
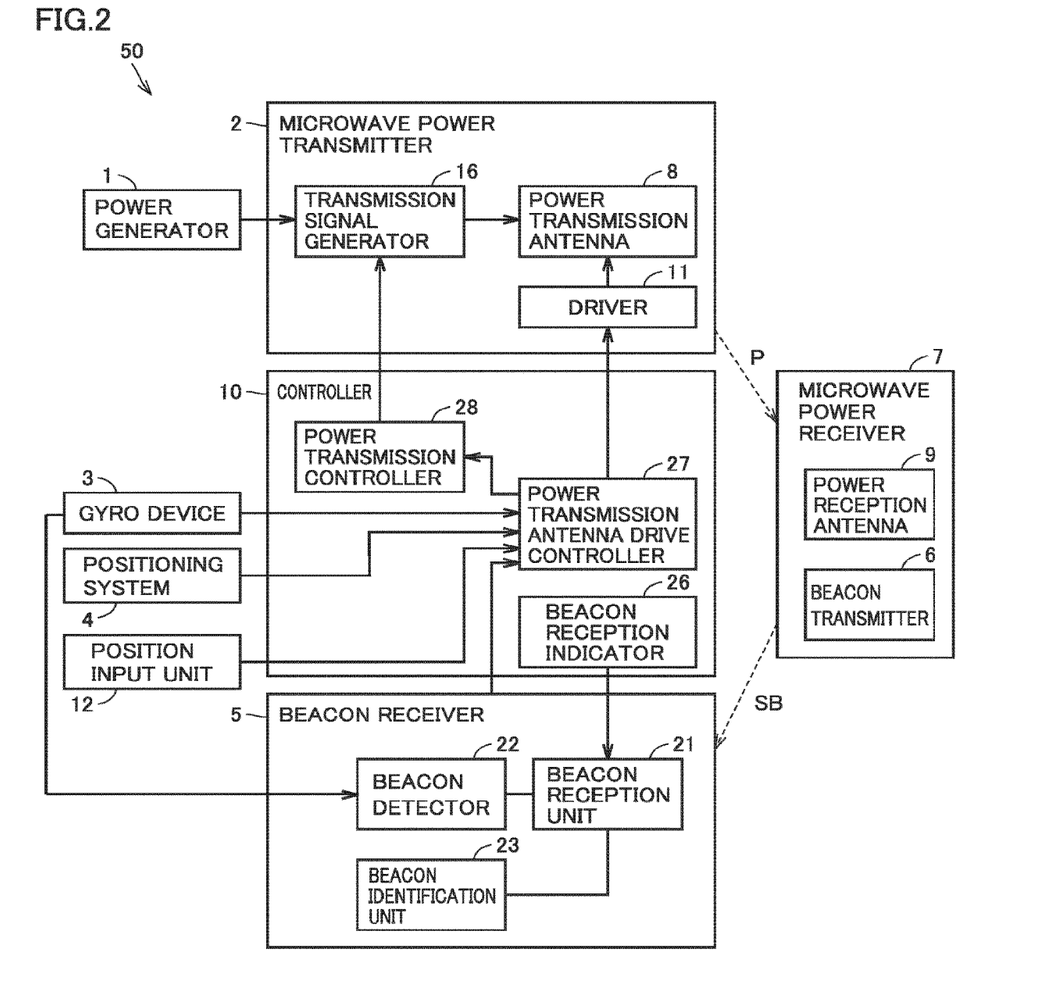
FIG. 2 is a block diagram showing the configuration of FIG. 1 in detail.

FIG. 1 is a schematic diagram showing a system configuration of an electric power transfer system according to an embodiment of the present disclosure. FIG. 2 is a block diagram showing the configuration of FIG. 1 in detail. These figures show a configuration for transferring electric power by microwaves from the power transmission side to the power reception side, where electric power is transferred by microwaves P from the power transmission side to the power reception side, and a beacon signal SB is transmitted from the power reception side to the power transmission side.

Each equipment of a microwave power transmission apparatus 50 on the power transmission side is installed on a floating body 15 floating on the sea or the like. Microwave power transmission apparatus 50 includes a power generator 1, a microwave power transmitter 2, a gyro device 3, a positioning system 4, a beacon receiver 5, a tower body 14, and a controller 10. Floating body 15 is floating on the water, and has the equipment of the power transmission apparatus installed thereon. The phrase "on the water" or "on the sea" does not mean only the sea, but also includes situations of installation on the water including a lake, a bay, a cove, a fjord, a mouth of a great river, a harbor or the like.

FIG. 1 shows a wind turbine as an example of power generator 1. Power generator 1 converts wind energy of wind blowing over the sea into electric energy by the wind turbine and a generator. Power generator 1 may perform power generation different from the wind power generation, such as tidal power generation or photovoltaic power generation.

Microwave power transmitter 2 converts the electric energy generated by power generator 1 into microwaves and emits them toward land. Microwave power transmitter 2 includes a transmission signal generator 16, a power transmission antenna 8, and a driver 11. Transmission signal generator 16 generates a transmission signal in a frequency band of microwaves amplified with the power generated by power generator 1. The transmission signal generated by transmission signal generator 16 is sent to power transmission antenna 8. Power transmission antenna 8 emits the transmission signal as radio waves (microwaves) toward a microwave power receiver 7.

Driver 11 can change a direction in which power transmission antenna 8 emits the microwaves. For example, driver 11 mechanically changes the orientation of power transmission antenna 8 by a turntable or the like. If power transmission antenna 8 is an active phased array antenna (APAA), then driver 11 may control the phase of a microwave emitted by each element antenna of the array antenna, to change the direction in which the microwaves are emitted.

The APAA is an antenna that emits microwaves from multiple element antennas arranged in a planar manner, and controls the phase of the microwave emitted from each element antenna, thereby performing beam scanning and beam forming as intended.

As power reception side equipment, microwave power receiver 7 is installed on land. Microwave power receiver 7 includes a power reception antenna 9 and a beacon transmitter 6. Microwave power receiver 7 is a power receiver to receive the power transferred by radio waves from microwave power transmission apparatus 50 which is a wireless electric power transmission apparatus.

Power reception antenna 9 of microwave power receiver 7 receives the power emitted by microwaves from microwave power transmitter 2. Beacon transmitter 6 transmits, from a position in proximity to power reception antenna 9, beacon signal SB indicating the position of power reception antenna 9 to microwave power transmission apparatus 50. Beacon transmitter 6 transmits beacon signal SB having a frequency predetermined to correspond to microwave power receiver 7. Beacon signal SB transmitted by beacon transmitter 6 is modulated with an identification code predetermined for each power receiver, so as to distinguish microwave power receiver 7 from other power receivers. If multiple frequencies can be used for beacon signal SB and microwave power receiver 7 can be identified only by the frequency, then the identification code may not be used. Alternatively, only one frequency may be used for beacon signal SB.

Specifications of microwave power receiver 7 (positional information of microwave power receiver 7, information about beacon signal SB (frequency, identification information, etc.)) are inputted to controller 10 included in microwave power transmission apparatus 50 by the user through a position input unit 12. Positioning system 4 obtains positional information of floating body 15 (or microwave power transmitter 2 determined by floating body 15). Gyro device 3 obtains posture information of floating body 15 (or microwave power transmitter 2 determined by floating body 15).

Controller 10 includes a power transmission antenna drive controller 27, a beacon reception indicator 26, and a power transmission controller 28. Upon input of the position of microwave power receiver 7 from the user, power transmission antenna drive controller 27 calculates, based on the position of microwave power transmitter 2 inputted from positioning system 4, a direction from the position of microwave power transmitter 2 toward microwave power receiver 7 (reference orientation angle). A GPS (Global Positioning System) receiver, a goniometer or the like may be used, for example, as positioning system 4. Beacon reception indicator 26 controls the reception of the beacon signal and the setting required for the reception.

Beacon signal SB transmitted by microwave power receiver 7 comes from the direction calculated by controller 10 (reference orientation angle). Beacon receiver 5 includes a beacon reception unit 21, a beacon detector 22 and a beacon identification unit 23. Beacon reception unit 21 receives beacon signal SB from microwave power receiver 7. Beacon detector 22 processes beacon signal SB to detect a coming direction of beacon signal SB. As a method of detecting the coming direction of beacon signal SB by beacon detector 22, a monopulse angle measurement method, a conical scanning method of conically scanning an antenna having the directivity of beacon reception unit 21 at a minute angle, or the like is employed. Beacon detector 22 corrects an entry angle of beacon signal SB entering into beacon reception unit 21 with a posture angle obtained by gyro device 3, to determine a coming direction being independent of the posture angle. The coming direction being independent of the posture angle is tracked. Beacon detector 22 calculates a coming direction of beacon signal SB, which is obtained by the tracking, as a direction in which the power receiver exists. Since beacon detector 22 constitutes beacon receiver 5, beacon receiver 5 is also considered to calculate the direction in which the power receiver exists.

Gyro device 3 may not be provided, and the radio waves may be emitted in the coming direction determined from beacon signal SB. The coming direction of beacon signal SB may not be determined, and the direction in which microwave power receiver 7 exists may be determined from the positional relation between microwave power transmission apparatus 50 and microwave power receiver 7 and the posture angle measured by gyro device 3, to control power transmission antenna 8 by driver 11 such that it is oriented in the direction in which microwave power receiver 7 exists. A method of correcting the coming direction determined from beacon signal SB with the posture angle may also be employed.

In a situation where power transmission antenna 8 is shaken within such a degree that transmission antenna 8 can be changed in its orientation direction by driver 11 to be oriented in the direction in which microwave power receiver 7 exists, an antenna of beacon reception unit 21 can reliably receive beacon signal SB. Specifically, the antenna of beacon reception unit 21 has a directivity sufficiently wider than the directivity of power transmission antenna 8. Alternatively, the directivity of the antenna of beacon reception unit 21 is set to be approximately equal to or slightly wider than the directivity of power transmission antenna 8, and the orientation direction of the antenna of beacon reception unit 21 is changed in coordination with power transmission antenna 8.

Beacon identification unit 23 identifies beacon signal SB as being indicated by controller 10. That is, beacon identification unit 23 checks whether or not the identification code and the frequency of received beacon signal SB are transmitted from microwave power receiver 7 to which microwave power transmitter 2 is to transfer electric power by microwaves. An identification code with which a beacon signal is modulated is identification information that identifies the beacon signal. Detecting an identification code of a beacon signal is also referred to as detecting identification information included in the beacon signal. Identification information that identifies a beacon signal may be other than an identification code.

When beacon signal SB from destination microwave power receiver 7 is being properly received, microwave power transmitter 2 emits microwaves as follows.

Power transmission antenna drive controller 27 calculates, based on the coming direction of beacon signal SB detected by beacon detector 22 and the posture angle detected by a posture sensor, an orientation direction such that power transmission antenna 8 is oriented to microwave power receiver 7.

In the present embodiment, gyro device 3 is provided as the posture sensor. Gyro device 3 detects motion of power transmission antenna 8, and outputs a posture angle obtained by taking into account a signal of that motion (roll direction/pitch direction/yaw direction) to power transmission antenna drive controller 27.

Power transmission antenna drive controller 27 controls, while performing motion correction operation to correct the antenna orientation angle corrected with posture angle by using the motion signal, driver 11 such that power transmission antenna 8 is continuously directed to power reception antenna 9 stably and rightly. Since the motion of a floating body is often periodic and is easy to predict, by using the predicted motion obtained by the prediction process in the motion correction operation, the orientation of power transmission antenna 8 can be changed before the orientation direction of power transmission antenna 8 is deviated significantly from power reception antenna 9.

Microwave power receiver 7 receives and converts microwaves P emitted from microwave power transmitter 2 into electric power, and transmits the power to an electric power system on land (not shown).

During the microwave emission from power transmission antenna 8 toward power reception antenna 9, controller 10 checks at short intervals whether beacon signal SB is being received by beacon receiver 5. When it is detected that beacon signal SB is not being received by beacon receiver 5, the microwave emission is stopped. In this manner, when the microwaves are emitted in such a direction that the microwaves cannot be received by power reception antenna 9 because the orientation direction of power transmission antenna 8 is deviated significantly due to motion such as winds and waves, waste and loss of power transmitted but not received by microwave power receiver 7 can be suppressed.

The transmission of beacon signal SB may be stopped in the event of some failure in microwave power receiver 7. The beacon signal SB enables the power transmission to be stopped when microwave power receiver 7 cannot receive the power. In addition, in order to prevent the occurrence of a situation where microwave power receiver 7 cannot receive the power due to change of the orientation of power transmission antenna 8, microwave power transmitter 2 may be caused to emit the microwaves when beacon signal SB is being received and the posture angle is within a predetermined range.

Controller 10 that performs such antenna orientation control for microwave power transmission can be implemented by either software or hardware.

Controller 10 can also be implemented by software using a computer, for example. In this case, controller 10 includes a CPU, a memory to store a program and data, and an interface.

Figure 3:
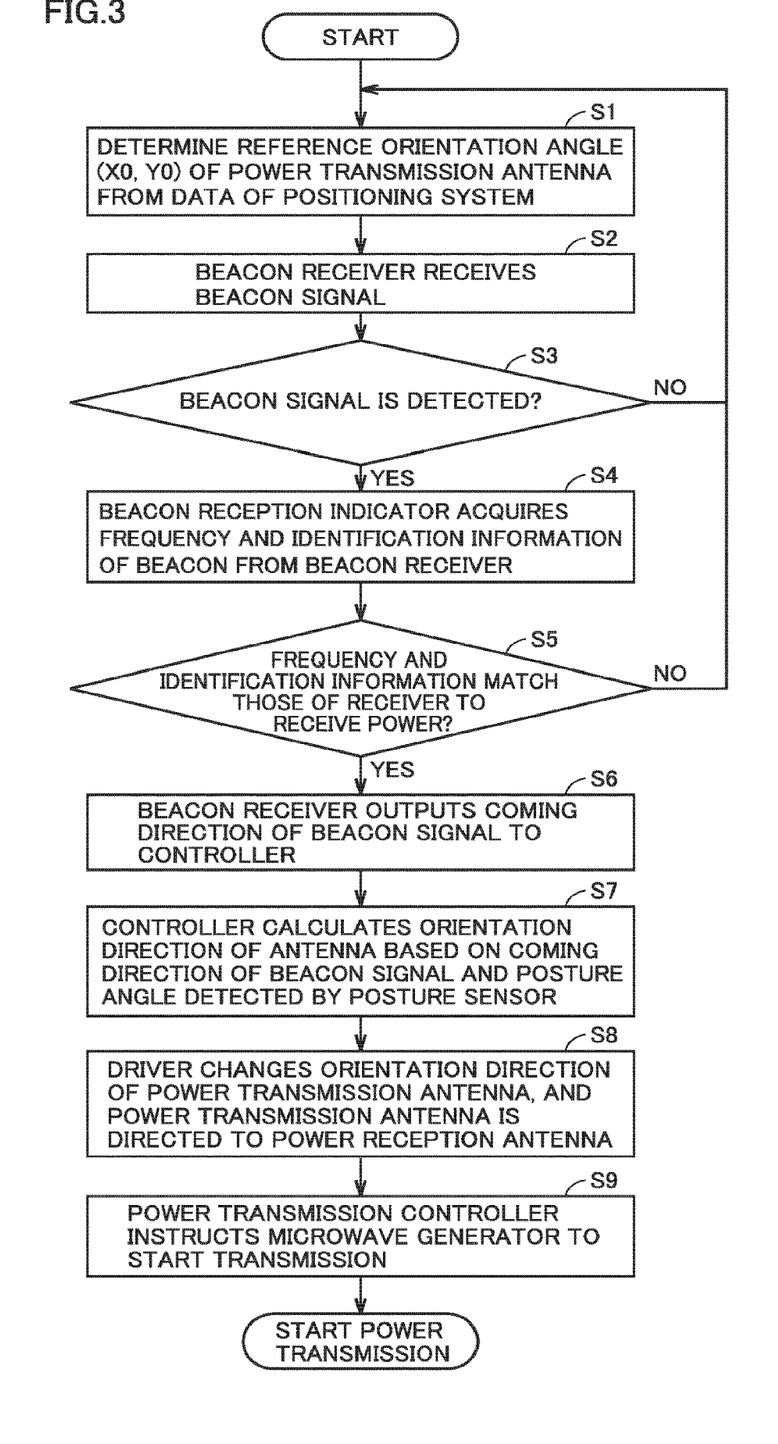
FIG. 3 is a flowchart illustrating a control process of starting power transmission performed by a controller 10.

FIG. 3 is a flowchart illustrating a control process of starting power transmission performed by controller 10. When the control process of starting power transmission is started, in step S1, power transmission antenna drive controller 27 of FIG. 2 determines a reference orientation angle (X0, Y0) of power transmission antenna 8 from data obtained by positioning system 4. Subsequently, in step S2, beacon reception indicator 26 outputs a reception instruction to beacon receiver 5, and in response to that reception instruction, beacon receiver 5 starts to receive beacon signal SB.

Subsequently, in step S3, it is determined whether or not beacon receiver 5 detects beacon signal SB. When beacon receiver 5 does not detect beacon signal SB in step S3 (NO in S3), the process of steps S1 and S2 is preformed again.

When beacon receiver 5 detects beacon signal SB in step S3 (YES in S3), the process proceeds to step S4, where beacon identification unit 23 obtains a frequency of beacon signal SB and identification information of beacon signal SB from a signal received by beacon reception unit 21. Preferably, the frequency and the identification information of beacon signal SB may be shown on a display (not shown).

Subsequently, in step S5, power transmission antenna drive controller 27 determines whether or not the frequency and the obtained identification information of beacon signal SB match a frequency and identification information corresponding to microwave power receiver 7 to which the microwaves are to be transmitted. When the frequency and the identification information do not match the corresponding frequency and identification information (NO in S5), the process of steps S1 through S4 is repeated.

When the frequency and the identification information match the corresponding frequency and identification information in step S5 (YES in S5), the process proceeds to step S6. In step S6, beacon detector 22 detects a coming direction of beacon signal SB from the signal received by beacon reception unit 21, and calculates a direction in which the power receiver exists from the detected coming direction. Beacon detector 22 outputs the calculated direction in which the power receiver exists to power transmission antenna drive controller 27. Subsequently, in step S7, power transmission antenna drive controller 27 calculates, based on the coming direction of beacon signal SB and a posture angle detected by the posture sensor such as gyro device 3, a direction to which power transmission antenna 8 is caused to be directed. Power transmission antenna drive controller 27 calculating the direction to which power transmission antenna 8 is caused to be directed is also considered as power transmission antenna drive controller 27 correcting the direction, calculated by beacon detector 22, in which the power receiver exists. As power transmission antenna drive controller 27 is part of controller 10, controller 10 can also be considered to correct the direction in which the power receiver exists.

Specifically, in step S7, power transmission antenna drive controller 27 further corrects, based on data obtained by coordinate transformation of a gyro signal (which includes the magnitudes of motion in the roll direction, the pitch direction, the yaw direction) detected by gyro device 3, the coming direction of beacon signal SB detected by beacon detector 22 and calculates an antenna orientation angle. Subsequently, in step S8, power transmission antenna drive controller 27 controls driver 11 to change the posture of power transmission antenna 8 to be directed to an orientation corresponding to the antenna orientation angle. If power transmission antenna 8 is an APAA, then power transmission antenna drive controller 27 changes the direction of a beam such that the microwaves are emitted in the orientation corresponding to the antenna orientation angle. Power transmission antenna 8 thereby is directed to power reception antenna 9.

Subsequently, in step S9, power transmission controller 28 instructs transmission signal generator 16 to start outputting a transmission signal in a frequency band of the microwaves, and power transmission by microwaves is started. Through the above-described process, transmission signal generator 16 generates the transmission signal emitted from power transmission antenna 8 when beacon receiver 5 detects beacon signal SB, and stops generating the transmission signal when beacon receiver 5 does not detect beacon signal SB. In addition, transmission signal generator 16 generates the transmission signal when beacon receiver 5 detects the identification information predetermined for the power receiver to which the power is to be transmitted, and stops generating the transmission signal when beacon receiver 5 does not detect the predetermined identification information.

Figure 4:
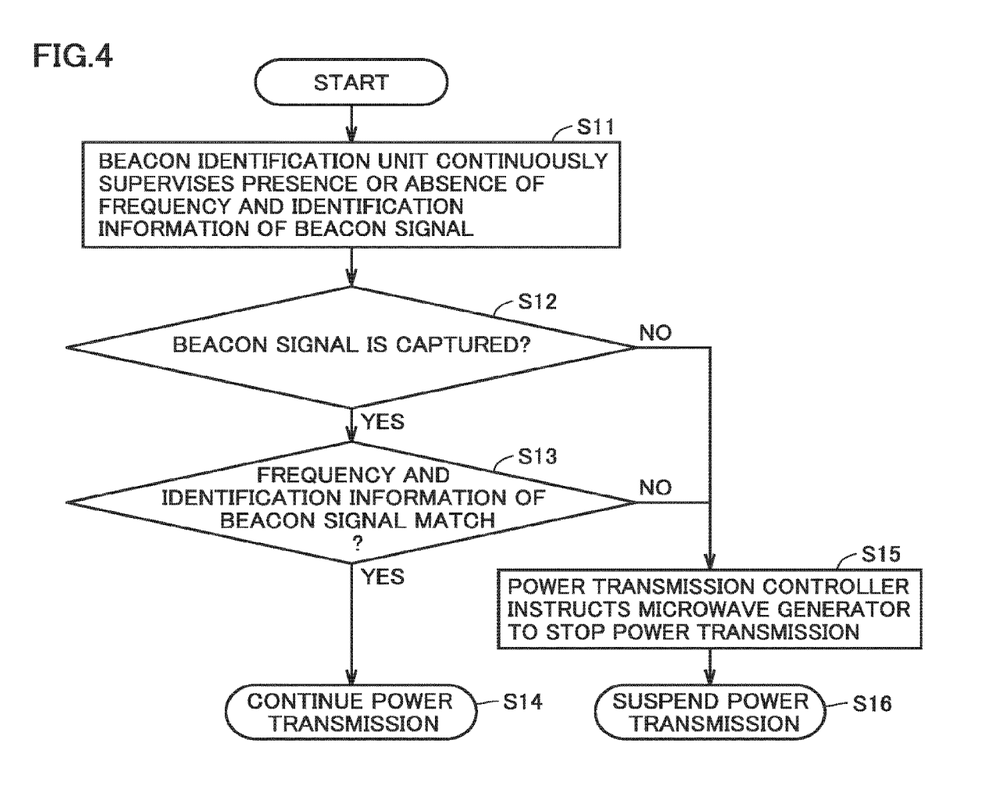
FIG. 4 is a flowchart illustrating a process of monitoring control during power transmission performed by controller 10.

FIG. 4 is a flowchart illustrating a process of monitoring control during power transmission performed by controller 10. The process of this flowchart is executed at regular intervals while power transmission by microwaves is performed.

When the process of monitoring control is started, in step S11, a process of receiving beacon signal SB at beacon receiver 5 of FIG. 2 is performed, where beacon identification unit 23 monitors the frequency and the identification information of beacon signal SB received. As the process of the flowchart in FIG. 4 is executed at regular intervals, this monitoring is carried out continuously.

Then, in step S12, power transmission antenna drive controller 27 determines whether or not beacon signal SB is being received by beacon receiver 5. When beacon signal SB is not being received in step S12 (NO in S12), the process proceeds to step S15. When beacon signal SB is being received in step S12 (YES in S12), the process proceeds to step S13. In step S13, power transmission antenna drive controller 27 determines whether or not the frequency and the identification information of beacon signal SB match the frequency and the identification information corresponding to microwave power receiver 7 to receive the power. When the frequency and the identification information match the corresponding frequency and identification information (YES in S13), the process proceeds to step S14, where the power transmission by microwaves is continued.

When the frequency or the identification information of beacon signal SB does not match the corresponding frequency or identification information in step S13 (NO in S13), the process proceeds to step S15. In step S15, power transmission controller 28 instructs transmission signal generator 16 to stop generating the transmission signal, and the power transmission is interrupted accordingly (step S16). In this manner, it can be quickly detected whether or not the antenna orientation is in right direction by using the beacon signal. When the antenna orientation is moved out of the power receiver, the situation in that the antenna orientation is not directed to the power receiver can be quickly detected to stop the microwave emission.

Figure 5:
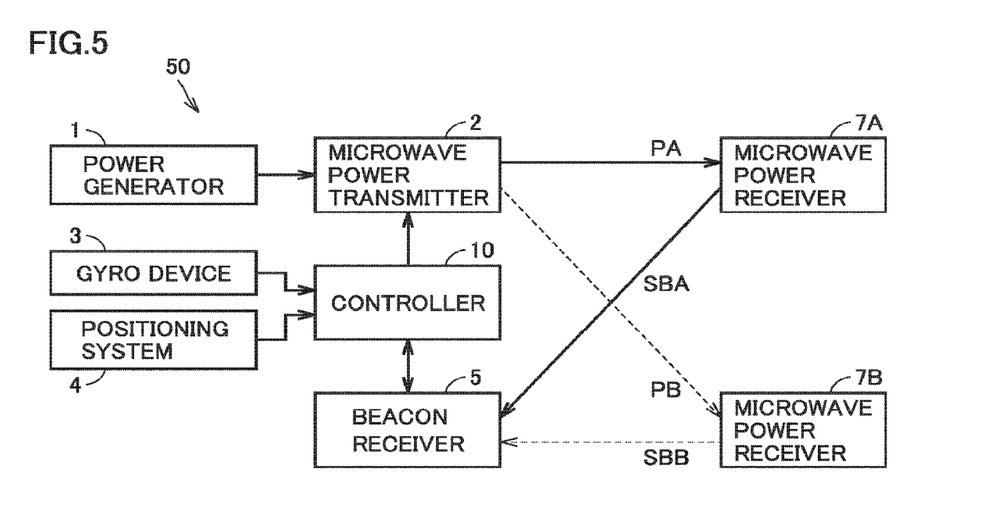
FIG. 5 is a schematic diagram showing a configuration where a plurality of microwave power receivers are provided for a microwave power transmitter.

When the power transmission is interrupted or the power transmission cannot be started, the destination of power transmission can be changed to another microwave power receiver. FIG. 5 is a schematic diagram showing a configuration where a plurality of microwave power receivers are provided for a microwave power transmitter. Microwave power transmission apparatus 50 on the power transmission side of FIG. 5 has the same configuration as that described in FIGS. 1 and 2. Microwave power receivers 7A and 7B are provided for this single microwave power transmission apparatus 50.

For example, under normal conditions, microwave power transmitter 2 receives a beacon signal SBA transmitted by microwave power receiver 7A, determines the orientation direction of power transmission antenna 8 to be directed to microwave power receiver 7A using that beacon signal, and emits microwaves PA.

In situations such as where the power transmission is stopped through the process illustrated in FIG. 4, the process of starting the power transmission of FIG. 3 is performed again. On that occasion, if beacon signal SBA from microwave power receiver 7A is not recovered, the process of starting the power transmission of FIG. 3 may be performed by changing the power receiver to which the power is to be transmitted to microwave power receiver 7B. When transmitting the power to microwave power receiver 7B, microwave power transmission apparatus 50 changes the orientation direction of power transmission antenna 8 to a direction determined by using a beacon signal SBB, and emits microwaves PB toward microwave power receiver 7B.

In this manner, in the event of disasters such as an earthquake, or during suspension due to maintenance of the power receiver, the power generation on the sea and the power transmission to land can be continued.

As described above, in microwave power transmission apparatus 50 of the present embodiment, controller 10 controls driver 11 such that power transmission antenna 8 is directed to power reception antenna 9 at all times even under the influence of waves and winds. Controller 10 calculates the antenna reference orientation angle using the signal from positioning system 4, and causes beacon receiver 5 to be oriented in the direction of the antenna reference orientation angle and capture beacon signal SB before the start of power transmission by microwaves. Controller 10 performs the correction computation from the antenna reference orientation angle based on the coming direction of beacon signal SB from microwave power receiver 7. Controller 10 drives, while further performing the motion correction operation using the motion signal from gyro device 3, power transmission antenna 8 so as to be directed to power reception antenna 9 continuously and stably.

Further, microwave power transmission apparatus 50 of the present embodiment can check that the proper beacon signal is being received based on the identification information of beacon signal SB, and therefore does not transmit the power in a wrong direction in which microwave power receiver 7 does not exist. The transmission is stopped when beacon signal SB stops being received, so that power loss that occurs when the power is transmitted to anything other than the reception antenna can be avoided.

In the embodiment described above, power transmission antenna drive controller 27 calculates the orientation direction of power transmission antenna 8 based on the coming direction of beacon signal SB that is detected by beacon detector 22. However, in situations such as where the reference orientation angle calculated in step S1 of FIG. 3 can be calculated with a sufficient degree of accuracy, or where the coming direction of the beacon signal is not calculated with a sufficient degree of accuracy in step S6 of FIG. 3, power transmission antenna drive controller 27 may be configured, in step S7, to calculate the orientation direction of the power transmission antenna based on the reference orientation angle and the posture angle detected by the posture sensor.

[Variation]

The embodiment above has described an example where the microwave power transmission apparatus is provided on the floating body on the sea. Microwave power transmission, which transmits electric power wirelessly, can also be used in a situation where the power reception side equipment is provided on the floating body on the sea.

Figure 6:
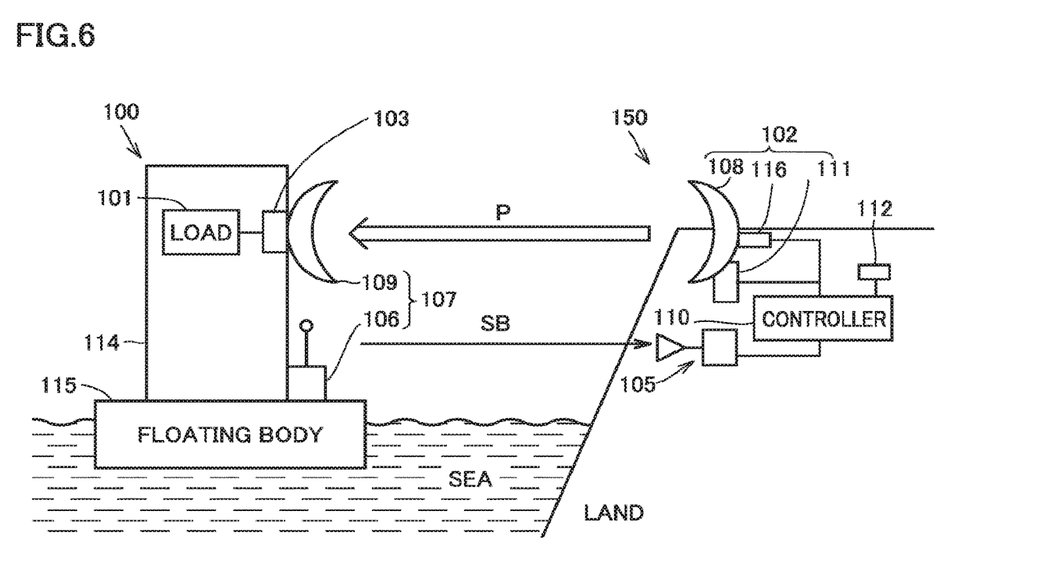
FIG. 6 is a schematic diagram showing a configuration where power reception side equipment is installed on the sea.

FIG. 6 is a schematic diagram showing a configuration where the power reception side equipment is installed on the sea. FIG. 6 shows a configuration where electric power is transferred by microwaves from the power transmission side on land to the power reception side on the sea, which is the same as the configuration of FIGS. 1 and 2 in that the power is transferred through microwaves P from the power transmission side to the power reception side, and that the beacon signal is transmitted from the power reception side to the power transmission side.

In this variation, each equipment of a microwave power transmission apparatus 150 on the power transmission side is installed on land. Microwave power transmission apparatus 150 includes a microwave power transmitter 102, a beacon receiver 105, a controller 110, and a position input unit 112. Microwave power transmitter 102 includes a transmission signal generator 116, a power transmission antenna 108, and a driver 111. Transmission signal generator 116 generates a transmission signal in a frequency band of the microwaves by using electric power from a commercial power supply or the like, for example. The transmission signal generated by transmission signal generator 116 is sent to power transmission antenna 108. Power transmission antenna 108 emits the transmission signal as radio waves (microwaves) toward a microwave power receiver 107.

Driver 111 can change a direction in which power transmission antenna 108 emits the microwaves. For example, driver 111 mechanically changes the orientation of power transmission antenna 108 by a turntable or the like. If power transmission antenna 108 is an active phased array antenna (APAA), then driver 111 may control the phase of a microwave emitted by each element antenna of the array antenna, to change the direction in which the microwaves are emitted.

As the power reception side equipment, a microwave power reception apparatus 100 is installed on a floating body 115 on the sea. Microwave power reception apparatus 100 includes a load 101, microwave power receiver 107, a microwave converter 103, a tower body 114, and controller 110. Microwave power receiver 107 includes a power reception antenna 109 and a beacon transmitter 106.

Power reception antenna 109 and beacon transmitter 106 have beam widths approximately equal to each other. The orientation directions of power reception antenna 109 and an antenna of beacon transmitter 106 are fixed at the same angle relative to tower body 114, or a mechanism is provided for changing the angles relative to tower body 114 in the same way for both antennas. That is, when beacon transmitter 106 transmits beacon signal SB in a direction in which microwave power transmission apparatus 150 exists, the microwaves emitted by microwave power transmission apparatus 150 can be received by power reception antenna 109.

The beam width of beacon signal SB transmitted by beacon transmitter 106 may be widened, and beacon signal SB is not transmitted in a situation where microwave power reception apparatus 100 cannot receive the power for some reason. The situation where microwave power reception apparatus 100 cannot receive the power corresponds, for example, to a situation where a failure has occurred in equipment, or a situation where the posture is significantly tilted.

Power reception antenna 109 of microwave power receiver 107 receives the microwaves emitted from power transmission antenna 108. Beacon transmitter 106 transmits beacon signal SB having a predetermined frequency in order to indicate the position of microwave power receiver 107 (power reception antenna 109). Beacon signal SB transmitted by beacon transmitter 106 is modulated with an identification code predetermined for each power receiver, so as to distinguish microwave power receiver 107 from other power receivers.

Load 101 may be any load that consumes electric power, examples of which include an electric installation of an offshore platform for mining natural resources such as oil or natural gas from the sea bed, a marine meteorological observation buoy, and a light buoy.

Microwave power receiver 107 converts the microwaves emitted from microwave power transmitter 102 into DC or AC power having an appropriate voltage, and supplies the power to load 101. More specifically, the microwaves received by power reception antenna 109 are converted into electric power by microwave converter 103 and supplied to load 101.

Upon input of the position of microwave power receiver 107, the information about beacon signal SB, and the position of microwave power transmitter 102 inputted by the user through position input unit 112, controller 110 calculates, based on the position of microwave power receiver 107 and the position of microwave power transmitter 102 that are inputted, a direction from the position of microwave power transmitter 102 toward microwave power receiver 107 (reference orientation angle).

Beacon signal SB from microwave power receiver 107 comes from the direction calculated by controller 110 (reference orientation angle). Beacon receiver 105 receives beacon signal SB coming from the reference orientation angle, before the microwave power transmission is performed. Beacon identification unit 23 checks whether or not the identification code and the frequency of beacon signal SB received are those of a power receiver to receive the power transmission. When it becomes possible for beacon receiver 105 to receive beacon signal SB, beacon receiver 105 processes beacon signal SB, and performs a tracking process so as to be able to continue to receive beacon signal SB.

When beacon signal SB from microwave power receiver 107 is being properly received, microwave power transmitter 102 performs a process of starting the power transmission as follows.

Controller 110 calculates a direction in which the power receiver exists, which is determined by performing the tracking process with respect to the coming direction of beacon signal SB, and determines that the direction is the orientation direction of power transmission antenna 108. Then, microwave power transmitter 102 starts emitting the microwaves toward microwave power receiver 107.

Beacon receiver 105 continues to receive the beacon signal while the microwaves are emitted from microwave power transmitter 102. Controller 110 causes beacon receiver 105 to receive the beacon signal repeatedly while the power emission is performed by microwaves. In a case where beacon receiver 105 does not receive the beacon signal, controller 110 determines that the case corresponds to a situation where power reception antenna 109 cannot receive the microwaves emitted by power transmission antenna 108 and stops the microwave emission.

As described above, the present disclosure can be applied successfully when the power reception side antenna is on the sea. Similar effects to those obtained when the power transmission side antenna is on the sea can also be obtained in the variation.

It should be understood that the embodiments disclosed herein are illustrative and non-restrictive in every respect. The scope of the present disclosure is defined by the terms of the claims, rather than the description of the embodiments above, and is intended to include any modifications within the scope and meaning equivalent to the terms of the claims. For the present disclosure, the embodiments can freely be combined or modification or omission of each embodiment can be made within the scope of the spirit of the disclosure.

REFERENCE SIGNS LIST

1 power generator; 2, 102 microwave power transmitter; 3 gyro device (posture sensor); 4 positioning system; 5, 105 beacon receiver; 6, 106 beacon transmitter; 7, 7A, 7B, 107 microwave power receiver (power receiver); 8, 108 power transmission antenna; 9, 109 power reception antenna; 10, 110 controller; 11, 111 driver; 12, 112 position input unit; 14, 114 tower body; 15, 115 floating body; 16, 116 transmission signal generator; 21 beacon reception unit; 22 beacon detector; 23 beacon identification unit; 26 beacon reception indicator; 27 power transmission antenna drive controller; 28 power transmission controller; 50, 150 microwave power transmission apparatus (wireless electric power transmission apparatus); 100 microwave power reception apparatus; 101 load; 103 microwave converter.

The invention claimed is:

1. A wireless electric power transmission apparatus comprising:
    a power transmission antenna to emit radio waves toward a power receiver, including a power reception antenna having a directivity, to receive electric power transferred by the radio waves when either one of the wireless electric power transmission apparatus and the power receiver is on sea and the other of the wireless electric power transmission apparatus and the power receiver is on land;
    a driver to cause the power transmission antenna to be directed to a direction in which the power receiver exists;
    a beacon receiver to detect a beacon signal transmitted by the power receiver; and
    a transmission signal generator to generate, when the beacon receiver detects the beacon signal, a transmission signal emitted as the radio waves from the power transmission antenna, wherein
    the emission of radio waves is stopped from the power transmission antenna in a case where the beacon signal is not detected, the case corresponding to a situation where either the power transmission antenna or the power reception antenna being on the sea is moved, motion of the power transmission antenna or the power reception antenna causes change in its orientation direction, and the power reception antenna cannot receive the radio waves emitted by the power transmission antenna.

2. The wireless electric power transmission apparatus according to claim 1, further comprising:
    a position input unit to which a position of the power receiver is inputted; and
    a controller to calculate the direction in which the power receiver exists based on the position of the power receiver inputted through the position input unit, and positional information of the wireless electric power transmission apparatus from a positioning system, wherein
    the driver causes the power transmission antenna to be directed to the direction, calculated by the controller, in which the power receiver exists.

3. The wireless electric power transmission apparatus according to claim 2, further comprising a posture sensor to detect a posture angle of the power transmission antenna, wherein
the controller corrects, with the posture angle, the calculated direction in which the power receiver exists.

4. The wireless electric power transmission apparatus according to claim 1, wherein
the beacon receiver calculates the direction in which the power receiver exists based on a coming direction of the beacon signal, and
the driver causes the power transmission antenna to be directed to the direction, calculated by the beacon receiver, in which the power receiver exists.

5. The wireless electric power transmission apparatus according to claim 4, further comprising:
a posture sensor to detect a posture angle of the power transmission antenna; and
a controller to correct, with the posture angle, the direction, calculated by the beacon receiver, in which the power receiver exists, wherein
the beacon receiver calculates the direction in which the power receiver exists based on the coming direction of the beacon signal and the posture angle.

6. The wireless electric power transmission apparatus according to claim 1, wherein
the beacon receiver detects identification information included in the beacon signal, and
the transmission signal generator generates the transmission signal when the beacon receiver detects predetermined identification information, and stops generating the transmission signal when the beacon receiver does not detect the predetermined identification information.

7. The wireless electric power transmission apparatus according to claim 2, wherein
the beacon receiver detects identification information included in the beacon signal, and
the transmission signal generator generates the transmission signal when the beacon receiver detects predetermined identification information, and stops generating the transmission signal when the beacon receiver does not detect the predetermined identification information.

8. The wireless electric power transmission apparatus according to claim 3, wherein
the beacon receiver detects identification information included in the beacon signal, and
the transmission signal generator generates the transmission signal when the beacon receiver detects predetermined identification information, and stops generating the transmission signal when the beacon receiver does not detect the predetermined identification information.

9. The wireless electric power transmission apparatus according to claim 4, wherein
the beacon receiver detects identification information included in the beacon signal, and
the transmission signal generator generates the transmission signal when the beacon receiver detects predetermined identification information, and stops generating the transmission signal when the beacon receiver does not detect the predetermined identification information.

10. The wireless electric power transmission apparatus according to claim 5, wherein
the beacon receiver detects identification information included in the beacon signal, and
the transmission signal generator generates the transmission signal when the beacon receiver detects predetermined identification information, and stops generating the transmission signal when the beacon receiver does not detect the predetermined identification information.

11. An electric power transfer system comprising:
a power receiver including
a power reception antenna to receive electric power transferred by radio waves, and
a beacon transmitter to transmit a beacon signal; and
a wireless electric power transmission apparatus including
a power transmission antenna to emit the radio waves toward the power receiver,
a driver to cause the power transmission antenna to be directed to a direction in which the power receiver exists,
a beacon receiver to detect the beacon signal transmitted by the power receiver, and
a transmission signal generator to generate, when the beacon receiver detects the beacon signal, a transmission signal emitted as the radio waves from the power transmission antenna, wherein
either one of the wireless electric power transmission apparatus and the power receiver is on sea and the other of the wireless electric power transmission apparatus and the power receiver is on land, and
the emission of radio waves is stopped from the power transmission antenna in a case where the beacon signal is not detected, the case corresponding to a situation where either the power transmission antenna or the power reception antenna being on the sea is moved, motion of the power transmission antenna or the power reception antenna causes change in its orientation direction, and the power reception antenna cannot receive the radio waves emitted by the power transmission antenna.

* * * * *